United States Patent [19]

Hoschler et al.

[11] 4,099,235
[45] Jul. 4, 1978

[54] METHOD OF OPERATING A DATA PROCESSING SYSTEM

[75] Inventors: Hans Höschler, Munich; Wolfgang Raimar, Riemerling; Klaus Brandmaier, Munich, all of Fed. Rep. of Germany

[73] Assignee: Siemens Aktiengesellschaft, Munich, Fed. Rep. of Germany

[21] Appl. No.: 777,513

[22] Filed: Mar. 14, 1977

Related U.S. Application Data

[63] Continuation of Ser. No. 465,613, Apr. 30, 1974, which is a continuation of Ser. No. 330,705, Feb. 8, 1973.

[30] Foreign Application Priority Data

Feb. 8, 1972 [DE]  Fed. Rep. of Germany ....... 2205914

[51] Int. Cl.² .................. G06F 15/16; G06F 15/20
[52] U.S. Cl. .................................................. 364/200
[58] Field of Search ... 364/200 MS File, 900 MS File; 179/8, 18 GF, 18 ES, 18 EA, 22 D

[56] References Cited

U.S. PATENT DOCUMENTS

| Re. 26,171 | 3/1967 | Falkoff | 364/200 |
|---|---|---|---|
| 3,411,140 | 11/1968 | Halina et al. | 364/900 |
| 3,566,357 | 2/1971 | Ling | 364/200 |
| 3,593,300 | 7/1971 | Driscoll, Jr. et al. | 364/200 |
| 3,641,505 | 2/1972 | Artz et al. | 364/200 |
| 3,643,227 | 2/1972 | Smith et al. | 364/200 |
| 3,648,253 | 3/1972 | Mullery et al. | 364/200 |
| 3,676,861 | 7/1972 | Ruth et al. | 364/200 |
| 3,692,989 | 9/1972 | Kandiew | 364/200 |
| 3,723,975 | 3/1973 | Kurtz et al. | 364/200 |

*Primary Examiner*—Harvey E. Springborn
*Attorney, Agent, or Firm*—Schuyler, Birch, Swindler, McKie & Beckett

[57] ABSTRACT

A method of operating a data processing system having at least two real-time data processors is described. The method permits the processing of tasks with minimal delay. Given tasks may be coupled to one of the data processors, depending on the type of task and which of the processors has been preselected to operate on such tasks. Each of the data processors is continuously monitored for the purpose of continually determining the utilization ratio for each processor. Each processor is assigned a predetermined upper limit value for its utilization ratio, which value lies below the processor's overload limit. If the upper limit value is exceeded, tasks coupled to one data processor are diverted to another data processor. In the other processor the diverted tasks are processed after the program switchover.

6 Claims, 3 Drawing Figures

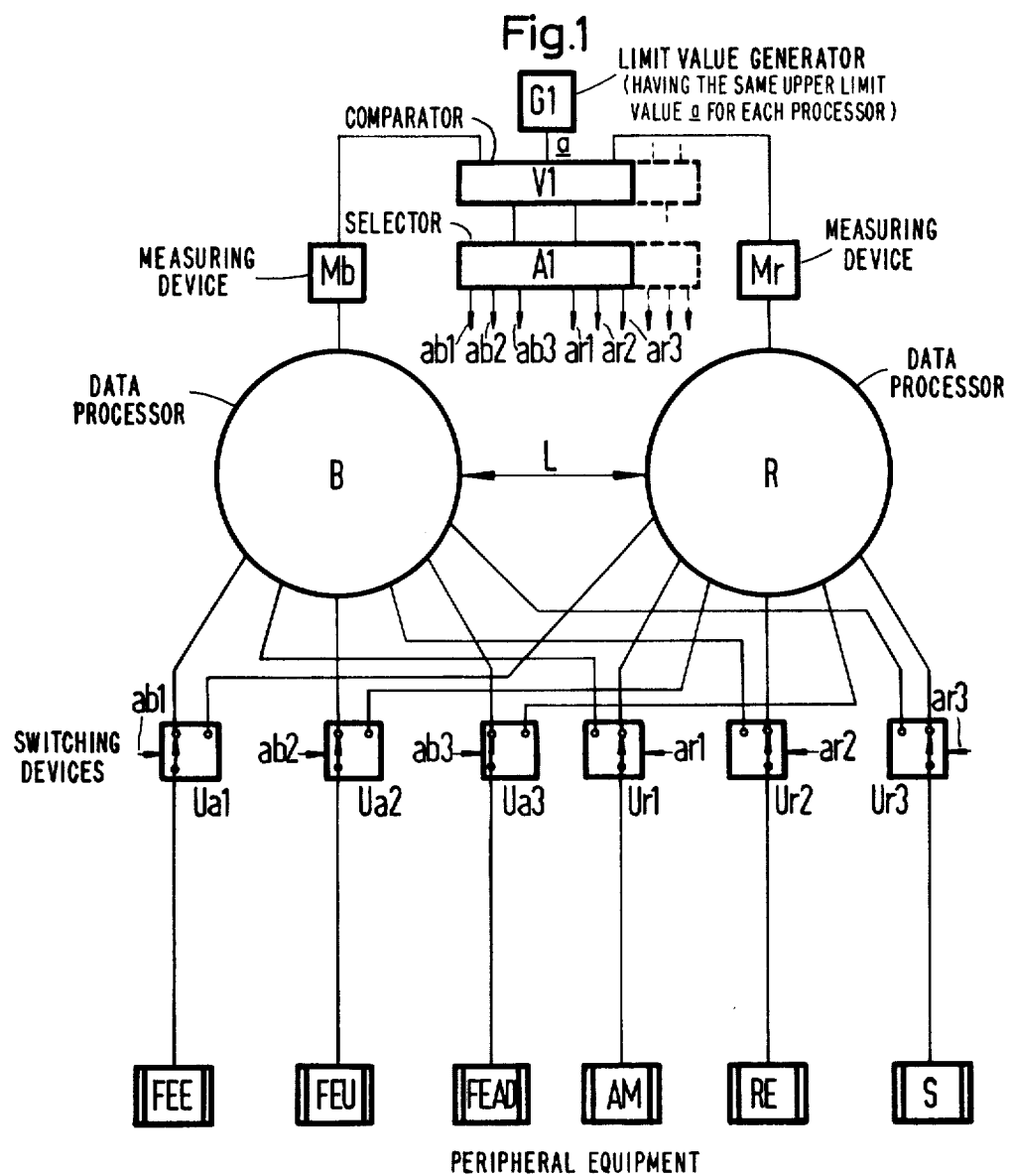

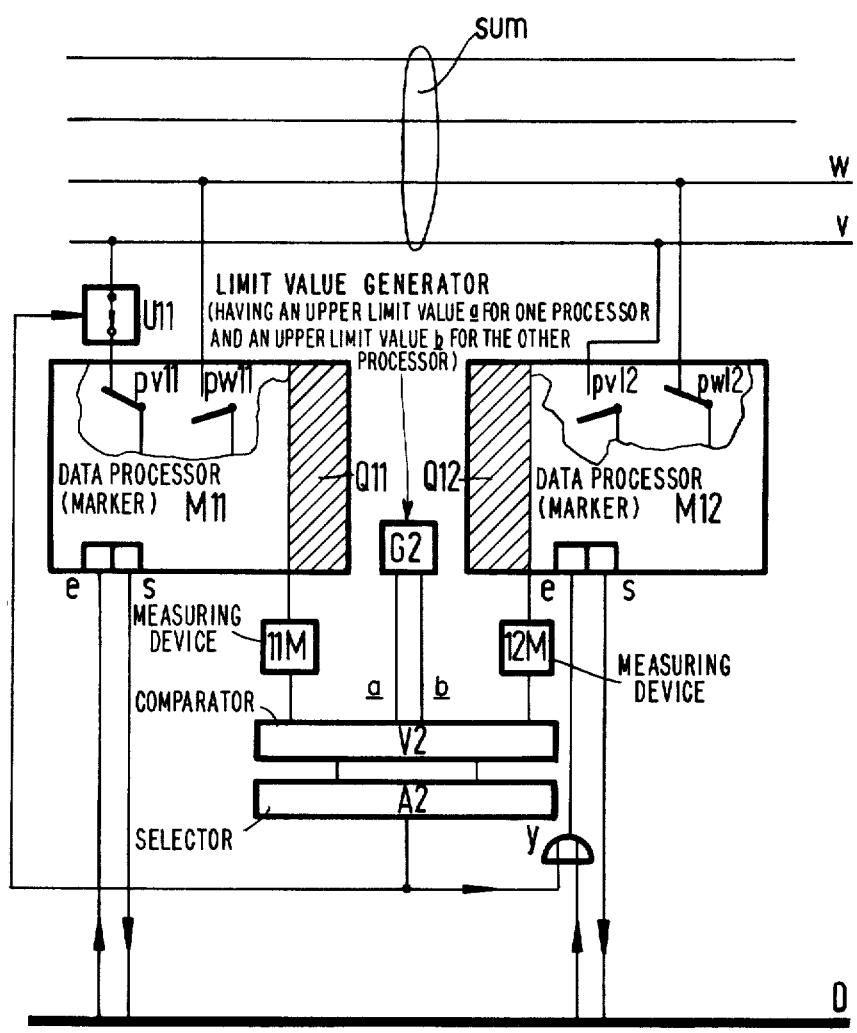

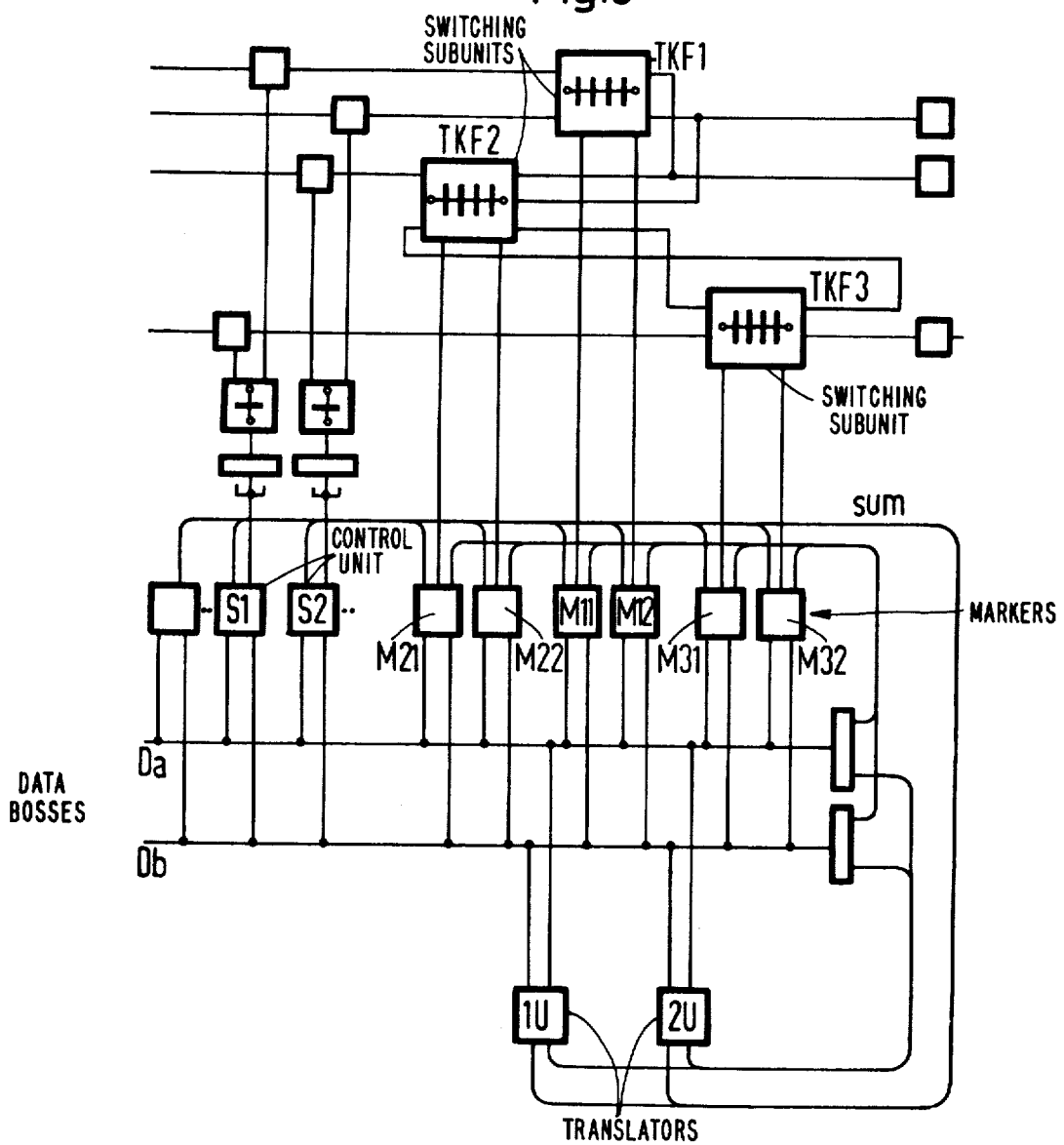

METHOD OF OPERATING A DATA PROCESSING SYSTEM

This is a continuation, of application Ser. No. 465,613, filed Apr. 30, 1974, which is a continuation application of Ser. No. 330,705, which was filed Feb. 8, 1973.

BACKGROUND OF THE INVENTION

This invention relates to a method of operation for data processing apparatus, and in particular such a method is described which is especially useful in telecommunication switching systems.

Data processing systems are known comprising a plurality of computers, storage units and input/output control units which cooperate with one another. This cooperation is coordinated by automatic control equipment, and the work is distributed according to well-defined rules determining priority. The priority or precedence can be established as a function of the time, external demands, as well as programs and functions of variable conditions. Accordingly, the control equipment causes programs to be run, whereby the completion of programs and conditions for the interruption thereof are taken into consideration (see West German Pat. No. 1,449,532, pp. 1 and 2, claims 4 and 15 and corresponding U.S. Pat. No. 3,419,849). Obviously, during the cooperation of sections of a data processing system there is traffic between the sections with data being transmitted therebetween. It is also well known that traffic and statistical considerations for the convenient construction and dimensioning of such equipment for data processing systems play a part. These matters have already been dealt with, but concrete solutions have not yet been proposed (see "Elektronische Rechenanlagen," 1970 pp. 249 - 252).

If desired, the above mentioned sections of data processors can be combined into various complete data processors which together form the data processing system (see "Elektronik" 1969, pp. 217 - 219). The commands accumulating in such a data processing system can be operated upon in batch processing where, as a first step, they are grouped for processing. In contrast, in real-time processing, each task is processed immediately after its appearance. The commands usually do not appear at regular time intervals, but are statistically distributed according to the calculus of probabilities. This must be taken into consideration when designing a real-time data processing system, so that in case of job accumulation the response time will not be exceeded (see Lobel, Muller, Schmidt: "Lexikon der Datenverarbeitung," second edition, pp. 418, 419, and 482). An overload condition will exist if the response time is exceeded; that is, a data processor becomes loaded with so many tasks that it delays dealing with them for longer than a predetermined time, i.e., it no longer operates in real time. Furthermore, such data processing system can also be operated efficiently, so that the attainable benefits can be taken advantage of. It is not sufficient by means of a control equipment which only considers predetermined priorities or precedences to coordinate the cooperation of the sections pertaining to the data processing system, so that the system will operate efficiently, particularly to avoid delays.

SUMMARY OF THE INVENTION

The invention teaches a method how a data processing system having at least two independent program controlled, real-time data processors can be operated very conveniently so as to avoid undue delays. This avoidance of delays is particularly important in data processing systems used in telecommunication systems, where commands originating with a large number of subscribers must be processed on time.

The invention relates to a method of operating a data processing system, more particularly for telephone switching systems, having at least two independent program controlled, real-time data processors which are to process the tasks coupled thereto within a given time. This method is characterized in that the tasks are coupled to one data processor in accordance with their varying characteristics. For each data processor there is continuous supervision as to the magnitude of its utilization ratio resulting from tasks coupled to it. If a predetermined upper limit value for this utilization ratio, lying below an overload, is exceeded, tasks coupled to one data processor are temporarily deflected to another data processor in which the predetermined upper limit value is not exceeded. In the other data processor the diverted tasks are each processed after the program changeover.

Due to the alternative routing of these tasks, undue accumulation of processing tasks in one and the same data processor is advantageously avoided, so that the traffic is distributed more evenly, than otherwise would be the case, to the associated data processors. Thus, traffic congestion is, likewise, avoided which would have deleterious effects, such as delay in requests for access to a computer core, decreasing the efficiency thereof. Moreover, the waiting periods for the storage accesses of an input/output device would be exceeded (see "Elektronische Rechenanlagen," 1970, pp. 249 - 250, pos. 2)

A method of operating centrally controlled switching systems is known, wherein central control equipments are employed and wherein there is continuous supervision of the ratio of the number of control processes for the through-connection in the switching matrix to the number of other control processes. However, this supervision leads to the momentary restriction of certain operational features (see West German Published Patent Specification 1,940,502 and corresponding British Pat. No. 1,283,832). There is no such restriction in the method according to the present invention. Furthermore, this method is distinguished from the prior art method in that the supervision itself is aimed at other processes, so that in the method according to the invention preferably the ratio of the holding time resulting from coupled tasks to the time free thereof is measured as utilization ratio, which gives an entirely different ratio than in the prior art method.

As pointed out above, the method in accordance with the invention is particularly applied to telecommunication switching systems, although other applications are contemplated. In telephone systems it can be employed for a data processing system containing a control or operating computer and an administrative computer, to which various operating positions are connected for processing technical services. However, it may also be applied to a data processing system containing two markers with switchable programs as data processors associated with an indirectly controlled exchange and designed to perform specified control processes.

BRIEF DESCRIPTION OF THE DRAWINGS

The principles of the invention are described hereinbelow by descriptions of preferred forms of apparatus capable of performing the inventive method. These apparatus are illustrated in the drawings wherein:

FIG. 1 is a block-schematic diagram of a data processing system having a control computer and an administrative computer and operating positions connected thereto;

FIG. 2 is a block-schematic diagram of two markers pertaining to a telephone exchange; and FIG. 3 is a block-schematic diagram illustrating the details of the arrangement of an indirectly controlled exchange to which pertain, inter alia, the markers shown in FIG. 2.

DETAILED DESCRIPTION OF THE DRAWINGS

Before describing the exemplary embodiments for performing the invention in detail, several general steps will be discussed. Thus, it is convenient, according to the inventive method, to divert task to the data processor which is the least utilized, if more than two data processors are provided. To divert task, peripheral equipments operating as the sources of the task, can be switched from the overloaded data processor and connected to a data processor, which is not working at full capacity. It is very convenient to assign the tasks, from the start, to the data processors in accordance with their characteristics, such that the highest utilization ratio of the data processors can be expected at different intervals. Thus, one can prevent several data processors from having the highest utilization ratio at the same time. The momentary diversion of tasks is halted if the predetermined upper limit value is not reached by a sufficient margin. It is also very convenient to make provisions for alternately routing a different portion of the tasks to adjust to different overrun stages of the predetermined upper limit value. For example, this can be effected by diverting different kinds of tasks, or by rendering the alternative routing effective for given time intervals only. Additional task which can be processed using the batch technique can be coupled to a data processor, whose utilization ratio lies substantially below the preset limit value.

In the data processing systems illustrated in FIGS. 1 and 2, a measuring means is connected to each data processor for measuring the utilization ratio. Thus, measuring means Mb and Mr are connected to the data processors B and R associated with the data processing system shown in FIG. 1. Various data processing systems of the type described herein for application of this invention are known and may be used. Accordingly, the specific details of the construction of the data processors are immaterial to an understanding of this invention and are not set forth in great detail herein. However, these data processors are further described hereinbelow, as necessary to permit a better understanding of an application of the invention. Measuring means 11M and 12M are connected to the data processors M11 and M12 associated with the data processing system illustrated in FIG. 2. In a telephone switching system, such as described herein, the data processors M11 and M12 take the form of markers, which are described in detail in British Pat. No. 1,244,420.

Each of these measuring means receive measuring signals from the associated data processors. For example, to measure the ratio of the holding time due to coupled task with respect to the free time thereof, a measuring signal is sent to the measuring means concerned during the holding time, which, in turn, retransmits a measured value corresponding to the utilization ratio by means of a time measuring means. As has become clear from the foregoing description, the measuring means are conventional time measuring devices; accordingly, they are not described in detail herein. A detailed description of the construction and operation of the aforementioned measuring means will be found in U.S. Pat. Nos. 3,347,990 and 2,976,365. Markers, which correspond in construction and function as computers, rely on well known and readily available time measuring devices (see, "Proceedings of Eastern Computer Conference," 1958, pp. 197-203 and "The Bell Laboratories Record," Sept. 1954, pp. 321-324). A comparator means V1 or V2 is connected to each measuring means for comparing measured values, taking account of a predetermined upper limit value, which value is below an overload value. This upper limit value is supplied by the limit value generator G1 or G2 which is, likewise, connected to a comparator means V1 or V2. These generators are conventional voltage sources, which produce voltage values corresponding to the predetermined units. In the system shown in FIG. 1, the given upper limit value is the same for both of the data processing units B and R, so that upper limit value generator G1 supplies a common upper limit value to the comparator V1. In the system shown in FIG. 2, however, the given upper limit values differ for each of the markers M11 and M12; accordingly, generator G2 supplies different upper limit values to the comparator V2.

The comparator means V1 associated with the data processing system according to FIG. 1 then supplies comparison results between the predetermined upper limit value and the measured values supplied by the measuring means M$b$ and M$r$. The comparison results indicate whether the utilization ratio of the data processors B and R lies above or below the preset upper limit value. The selector means A1, a conventional switching circuit, connected to comparator V1, then determines the data processor to which tasks are to be diverted, taking account of said comparison results. The construction and operation of the selector is described in detail in U.S. Pat. No. 3,051,793.

To achieve this purpose, selector means A1 is provided with a large number of outputs. Should the utilization ratio of data processor B exceed the predetermined upper limit value, at least one of the outputs $ab1$, $ab2$ and $ab3$ provides a control signal. Should the utilization ratio of data processor R exceed the upper limit value, at least one of the outlets $ar1$, $ar2$ and $ar3$ provides a control signal. Such control signals cause the tasks to be diverted. Accordingly peripheral equipment operating as sources of tasks are disconnected from the overloaded data processor and connected to the data processor which is not overloaded. Equipment FEE, FEU, FEA, AM, RE and S are provided as conventional data processing peripheral equipment, for example, the input-output devices described in U.S. Pat. No. 3,665,404, or any other like devices for communicating data to or from data processing equipment, each being connected to both data processors over switching means U$a1$, U$a2$, U$a3$, U$r1$, U$r2$ and U$r3$. The switching means are in turn individually connected to the outlets *ab*1... *ar*3 of selector means A1 for the operation thereof.

For example, should the utilization ratio of data processor B, but not the utilization ratio of data processor R, exceed the predetermined upper limit value, the comparator means V1 of selector means A1 supplies comparison results such that it delivers a control signal over at least one of its outlets *ab*1, *ab*2, and *ab*3. This control signal reaches one of the switching devices U*a*1, U*a*2 and U*a*3, causing it to operate, so that the associated peripheral equipments are no longer connected to data processor B, but to data processor R. The foregoing switching devices are conventionally constructed signal-operated switches, and any of the various known types may be used, depending on the particular circuit configuration. A preferred form of such switching devices is described in detail in U.S. Pat. No. 3,665,404 wherein they are referred to as interrupt handlers. This reduces the utilization ratio of data processor B and enlarges that of data processor R. In the case of the lowest of the overrun stages approaching the predetermined limit value, a control signal is only provided over outlet *ab*1. Accordingly, the peripheral equipments FEE are switched over from data processor B to data processor R by means of switching means U*a*1.

In the case of a very large overrun of the predetermined limit value, control signals can be supplied, for example, over the two outlets *ab*1, and *ab*2, which, furthermore, results in the switchover of peripheral equipments FEU from data processor B to data processor R over switching means UA2. By means of two control signals, supplied over various combinations of outlets *ab*1, *ab*2 and *ab*3, several different overrun stages of the predetermined limit value can appropriately be taken into account. In like fashion, as described above, peripheral equipments AM, RE or S can be switched over from data processor R to data processor B, if control signals are provided over at least one of the outlets *ar*1, *ar*2 and *ar*3, which is the case if only the data processor R has a utilization ratio exceeding the predetermined upper limit value. In this case, as also in the other practical examples, the predetermined upper limit value is appropriately measured such that after it has been exceeded there still is a certain tolerance for operating the data processors without difficulty.

If the data processing system in accordance with FIG. 1 is supplemented by further data processors, measuring means associated therewith are to be connected to the comparator means V1. Comparator means V1 accordingly supplies more than two comparison values which are to be coupled to selector means A1. In this case, selector means A1 must take into account more than two comparison values during a selection process to determine the data processor in question.

In FIG. 2, the measuring means 11M and 12M, mentioned above, are connected to the comparator means V2 associated with the data processing system in accordance with FIG. 2. The limit value generator G2 supplies the upper limit value mentioned above for the utilization ratio of data processor M11 whose utilization ratio could be unduly exceeded without the aid of the invention. In the case under consideration, if the given upper limit value assigned to the data processing unit M11 is exceeded, any occurring tasks must be diverted to the data processing unit M12. However, this is only to be effected, if the utilization ratio thereof does not exceed a particular upper limit value, which, for example, lies substantially below the upper limit value first considered. Hence, comparator means V2 is arranged such that it still considers a particular upper limit for the loading of data processor M12, to which tasks may possibly have to be diverted. Therefore, limit value generator G2 supplies two different upper limit values, the last mentioned upper limit value being lower than the first mentioned upper limit value. The results of the comparison between these upper limit values and the measured values supplied by measuring means 11M and 12M are fed to selector means A2, which may be of the same construction as selector A1, which, thereupon, if desired, determines the diversion of tasks by means of a control signal transmitted from the outlet thereof to the disconnection switching circuit U11 and to the Or element Y.

The disconnection switch U11 which can be any desired form of electronically-responsive switch stops the feeding of certain commands which would otherwise reach the marker M11. The control signal is sent to the input *e* of marker M12 over the OR element Y, whereupon the latter is caused to be connected to line *v* by means of contact *pv*12, over which line, non-processed tasks from marker M11 arrive. The temporary diversion tasks, so established, is discontinued whenever the upper limit value predetermined for marker M11 is sufficiently underrun. The underrun span shall be made so large as to prevent a too-rapid succession of temporary diversion of tasks. This step is also recommended for the embodiment illustrated in FIG. 1. To adjust to the different overrun stages by which the predetermined upper limit can be exceeded, the diverted portion of the tasks can in each case be differentiated such that the diversion only occurs for time periods separated by pauses, for example, by means of a pulse-shaped control signal. It is also possible to achieve the functions of the measuring and the comparator means with the aid of special programs of the data processors being controlled, in which case, of course, the special measuring and comparator means are not needed. The alternative routings of tasks is then brought about directly by the data processors concerned, which cooperate through data communication.

The above description has been given for the method according to the invention for operating a data processing system which particularly relate to the measuring, comparator and selector means provided in the example according to FIG. 1 as well as in the example according to FIG. 2. In both examples, the tasks are processed subsequent to their alternative routing in the data processor concerned, in each case after the switchover of the program. To trigger this program changeover, the moment, for example, is utilized at which the diverted tasks, arrive over other inputs than the non-diverted tasks. Thus, for example, in data processor R of the data processing system according to FIG. 1, the diverted tasks arrive over impulse connected to switching means U*a*1, U*a*2, and U*a*3, while non-diverted tasks arrive over inputs connected to switching menas U*r*1, U*r*2 and U*r*3. In the data processor M12 of the data processing system in accordance with FIG. 2 diverted tasks arrive over the contact *pv*12 disposed at one input, while non-diverted tasks arrive over the contact *pw*12 disposed at another input.

Further information will now be given concerning the characteristics of the data processing systems illustrated in FIGS. 1 and 2, to which the method of the invention is applied. Additional steps for the development of the method will also be discussed.

The data processing system according to FIG. 1 is designed for telephone switching systems. Data processor B represents a control or operating computer, of the type well known in the art. This control computer is used to support the work accumulating in common maintenance stations for the telephone switching operation (see "Reports on Telephone Engineering, published by Siemens A.G., Berlin and Munich, West Germany" 1970, pp. 8 and 10). Here, data are logged which accumulate in a testing station, a maintenance service station and a telephone service interception station. This computer can, among other things, store the data concerned for documentation and statistics, output the same over data display devices and operating page printers and interpret and arrange them in accordance with their priorities. Also requests for information from storage can be processed by such a control computer (see commonly assigned U.S. pat. application Ser. No. 275,436, filed July 26, 1972, which is now abandoned in favor of Continuation Application Ser. No. 471,830 and which corresponds to British Pat. No. 1,391,084). Accordingly, the following positions are connected to the control computer B for processing technical services: operating positions FEE for the testing station, operating positions FEU for the maintenance service station, and operating positions FEAD for the telephone service interception station. In the lines leading from these operating positions to the control computer B are inserted the switching devices U$a$1, U$a$2 and U$a$3 referred to above, by which, if desired, tasks accumulating from said operating stations can also be diverted to data processor R.

Data processor R is here utilized as an administrative computer, where the following positions are connected for processing technical services: operating positions AM for the originating station, operating positions RE for the computation station, and other operating positions. Also, in the lines over which said operating positions are connected with the administrative computer are inserted the switching devices referred to above; namely, the switching means U$r$1, U$r$2 and U$r$3 through the operation of which, task to the central computer B can be diverted. This data processor, as well, is described in the prior art material referenced immediately above.

The operating area of a testing station includes the following: an information store regarding system malfunctions, operating test and control positions and the like. The operating functions of the maintenance service station include equipment supervision, alteration of subscriber and operating date, starting of test program runs, logging of wiring data for distribution frames and the like. In the case of a telephone interception service station, tasks for special services for subscribers are accepted and executed.

The control computer makes automatic processing of telephone service interceptions possible. New applications and alterations of subscriber lines are processed in the originating station, whereby existing lines, distribution frames and the like are to be taken into account. The information concerning these operations is held in the data storage of the administrative computer. This computer can also cooperate in further operating processes, for which the operating positions marked "S" are provided.

The data processors B and R participate in the processing of all these operating processes through data supply and data processing. In this connection, it is convenient to call upon the services of data display devices, with the data processor concerned participating in the processing by outputting the required data through a data display device and supplying data required thereby in the course of a conventional mode over equipments being used and found as a result of the ongoing task. The operating positions RE of a computation station are further connected to the administrative computer R, where, for example, the single and collective inquiries of call-charge conditions are processed. The distribution of all these operating positions over the two data processors B and R may also render a data communication between the control computer and the administrative computer necessary, with the two computers cooperating in a manner in itself known. The trunks L are employed for this cooperation between computers. Data and programs can be transmitted over these lines also, should this be necessary for the alternate routing of tasks. It is, therefore, convenient that the data processors B and R be physically adjacent to one another. If the wellknown technique of parallel processing of data processors (see "Elektronische Rechenanlagen," 1960, pp. 117 to 128) is applied, an interfering load of the other data processor can largely be avoided in the course of a data transmission.

In this case, the operating positions are distributed over the two data processors B and R such that the highest utilization ratio of the data processors can be expected at different times. Such operating positions are provided in the control computer B for which time constraint exists. The operating processes to be performed therein are caused by telephone subscribers, and the administration of the system cannot bring influence to bear on the even distribution of their tasks within the allotted time. Furthermore, the accumulating commands must be processed as rapidly as possible. However, the incoming tasks for technical services, in which the control computer R participates, are usually initiated by personnel operating the system. Hence, steps can be taken to distribute these tasks in a specified manner within the time available therefore, so that the highest possible utilization ratio of the administrative computer can be caused to occur at a different time than in the control computer B. The overall result is that although the control computer must necessarily work in real-time, the operation of the administrative computer is in certain respects similar to batch processing with reference to the utilization thereof by organization personnel. Thus, an opportunity is afforded in a particularly convenient manner to divert task in accordance with the method of this invention. Whenever the maximum utilization ratio of the control computer can be expected, a particularly low utilization ratio of the administrative computer can be preassigned, so that task can be alternately routed from the control computer B to the administrative computer R. At times when the utilization ratio of the control computer B is very low, task can be coupled thereto which are normally performed by the administrative computer R.

The data processing system according to FIG. 2 is, likewise, designed for telephone switching systems. The two markers M11 and M12, associated therewith as data processors, must perform control operations for the processing of call requests for a switching matrix. In this connection, different control operations for the same call can be processed sequentially and control operations for different calls can be processed concurrently.

According to FIG. 2, the markers are switched in a manner such that they process different control operations. This follows from the operating position of the associated contacts shown. In the case of the marker M11, the contact $pv11$ is closed, while the contact $pw11$ is open and, conversely, in the case of the marker M12 the contact $pv12$ is open, while the contact $pw12$ is closed. The markers are caused to operate through these contacts. For carrying out the control operations, the contacts are connected to request lines $w$ and $v$. One task at a time for one control operation arrives over request line $w$, and one task for the other control operation arrives over request line $v$. While of these control operations are carried out by the markers is determined by the operating position of the associated contacts. That is, a task is only effective in a marker whenever the contact, through which it is connected with the associated request line, is closed. If the two contacts provided in a marker are closed, it can be activated to perform both control operations. Each marker has a satellite storage. Storage Q11 is associated with the marker M11, storage Q12 with the marker M12. Each marker is so arranged that it works according to one of the programs read into its storage. Program switching can, for example, be brought about by means of signals which also act upon the storages.

If desired, the marker M12 can execute the control operations provided therefor from the start, as well as, as a substitute, the control operations normally performed by marker M11. This occurs, if the marker M11 otherwise becomes overloaded. If a marker breaks down completely, the other marker can even take over all control operations, as long as it is not overloaded. The data acquired by the markers are redirected from the sending outputs thereof via the common data bus D, from where specified data can also be fed to the markers. For example, request signals can also be fed to the markers over the data bus, which arrive at the particular receiving input e and are evaluated thereat. They can also be employed for the switchover to the requested control operation, thus rendering possible the redirection of request signals supplied by the selector means A2 to the input e of the marker M12 over the OR element Y.

The markers M11 and M12 may be associated with a telephone exchange of known construction (See West German Unexamined Patent Specification 1,812,192 and corresponding British Pat. No. 1,244,420). The construction of such an exchange is illustrated in detail herein in FIG. 3, where the markers M21 . . . M32 are provided in addition to the markers M11 and M12. The associated switching matrix comprises a plurality of switching subunits TKF1, TKF2 and TKF3, to each of which a pair of markers are assigned. The construction and operation of these switching subunits are described in British Pat. No. 1,244,420.

The switching subunit TKF1 is connected to the markers M11 and M12. Each switching subunit comprises a plurality of switching stages. The switching subunits are linked together, because the outputs thereof are partly connected in parallel; namely, the switching subunits TKF1 and TKF2 in a manner in itself known, and because the reverse overflow switches $rk$ are provided between the switching subunits TKF3 and TKF2, also in the known manner. Data to be coupled to the markers, among which, if desired, also the specified request signals indicated above for the control operations and data acquired by the markers are sent via the duplicated data busses D$a$ and D$b$, to which the markers are connected. The markers are requested by control units S1 and Sw over the request lines sum. S1 and S2 are control units participating in the processing of commands for control operations. In addition, two translators 1U and 2U are provided. The construction and operation of the control units and translators, in addition to their connected relationship as discussed above, are described in detail in British Pat. No. 1,244,420.

The characteristics of the various control operations will now be described. For example, the marker M11 can carry out, as a pretesting marker, a control operation to determine, if in a trunk group going out from the switching group or switching subgroup and predetermined by a call request, there is at least one free line. The marker M12 can then execute a control operation as a path marker, selecting free connecting paths in the switching group or switching subgroup and selecting and through-connecting one of them. In this case, a call request is processed in the following manner.

As a first step, a task for the control operation for the pretesting function is coupled to the markers M11 and M12 over the request line $v$. The marker M11 executes this control operation, the data required therefor and those acquired in the process being interchanged with other equipments over the data busses D$a$ and D$b$. At the same time, a task setting up, over the request line $w$, the other control operation, namely, for the path finding, selection and through-connection, can be processed by the marker M12. This control operation is processed for another call than the previous control operation. Thus, control operations for different calls are processed concurrently. Thereafter, it is to be expected that the marker M12 once more must operate as a path marker, namely for processing a control operation for one of the two calls mentioned above for which said control operation has not yet been processed. As indicated above, particularly the marker M12 can itself process the various control operations sequentially.

If there is a very heavy telephone traffic, e.g., during the busy or peak hour, the pretesting marker M11 should preferably not be expected to find a free line, at least with the first test. If several trunk groups must be tested separately, it must repeat one time or several times the control operation required for the test. Even then, it may not find an idle line. The overall result is that under these circumstances, on an average, several control operations to be executed by the pretesting marker M11 devolve upon one control operation to be executed by the path marker M12. Without special measures, this can further cause the pretesting marker to be overloaded. This can be remedied by the method of the invention, according to which, if a predetermined upper limit value lying below an overload is exceeded, the path marker M12 is also utilized for the pretesting function. To achieve this purpose, a portion of the tasks for the pretesting marker M11 is alternately routed, in the manner described above, to the path selecting marker M12, which processes the deflected tasks after each program switchover.

The principles of the method of this invention have been described herein in terms of the application of the invention to controlling the operations of a centrally controlled telecommunication system. This description is to be considered as being exemplary, and it is contemplated that other applications of the invention can be made, while still being within the scope of the appended claims. Further, the embodiments of the systems described for carrying out the invention may be changed or modified, or other systems used, without departing from the invention, as defined by the claims.

We claim:

1. A method of operating a data processing system having a plurality of independent, program controlled, real-time data processors for regulating the flow of tasks to said data processors from a plurality of sources to facilitate the processing of the tasks with minimal delay, comprising the steps of:

coupling said tasks to said data processors, monitoring and measuring, continually, the ratio of utilization of each of said data processors resulting from tasks received by them, selecting an upper limit value for the utilization ratio of each said data processor, which value lies below a value for the utilization ratio at which the data processor is overloaded, diverting the tasks coupled to one of said data processors to another of said data processors upon a determination that the utilization ratio of said one data processor exceeds its upper limit value and the utilization ratio of said another data processor does not exceed its upper limit value, and processing said diverted tasks in said another data processor.

2. The method defined in claim 1 comprising the further step of:

diverting different portions of said coupled tasks to adjust to different settings of said upper limit value to compensate for different overrun conditions.

3. The method as defined in claim 1 including the step of selecting as said another data processor the data processor having the lowest utilization ratio of said plurality of data processors at the time of diverting said coupled tasks.

4. The method defined in claim 1 wherein said sources are peripheral equipment and wherein the step of diverting said coupled tasks includes disconnecting the peripheral equipment coupled to said one data processor and connecting it to said another data processor.

5. The method defined in claim 1 comprising the further step of:

rerouting the diverted tasks being processed by said another data processor from said another data processor to said one data processor upon a determination that the utilization ratio of said one data processor has fallen below its upper limit value.

6. The method defined in claim 1 comprising the further step of:

additionally coupling tasks which are capable of being processed in batches to said another data processor wherein the utilization ratio of said another data processor is substantially below its upper limit value.

* * * * *